United States Patent Office 3,225,519
Patented Dec. 28, 1965

3,225,519
GAS ABSORPTION
Harold H. Stotler, Westfield, N.J., assignor to Hydrocarbon Research, Inc., New York, N.Y., a corporation of New Jersey
Filed Dec. 13, 1962, Ser. No. 244,422
10 Claims. (Cl. 55—48)

This invention relates to improvements in the removal of acidic components of mixed gases as by absorption in and desorption from acetone.

There are a number of carbon dioxide removal processes currently available, perhaps the oldest of which is water washing. Ethanolamine processes have superseded water washing to some extent because of the markedly reduced solvent circulation rates. In recent years, hot potassium carbonate processes which appear to have lower steam and cooling water requirements have also been used. Nevertheless, the available processes have been found to have commercial limitations and efforts have continued to develop more economical acidic gas separation systems due to the current large commercial requirements for pure hydrogen.

Among the prior art processes, the use of acetone has been suggested in the Kwauk patent, No. 2,880,581, and while this has proved to be a substantial improvement over preceding processes, it has been found that in some cases it also has a major disadvantage. Usually the feed gas and/or the stripping gas contains water with the resulting accumulation of moisture in the absorption system which will form carbon dioxide hydrates at the very low temperatures of operation. As a result, it is necessary, in accordance with the Kwauk process, to dry the acetone and the feed gases to a very low dew point and this thus becomes a substantial extra expense with large size plants.

It has also been found that the use of extremely low temperatures in the range of $-50°$ F. to $-124°$ F., as required in the above-mentioned patent and also required in some other systems, requires external refrigeration circuits and extensive use of heat exchangers to conserve the heat energy at the required levels. This tends to show a high facility cost as well as substantial operating expense.

In accordance with my invention, I have found it possible, in using acetone as the absorber liquid for acidic gases such as $CO_2$ and $H_2S$, to accomplish substantial economies both in facility costs and in operating costs by operating an integrated system at substantially higher temperatures more nearly ambient and under pressure differentials that permit me to take advantage of the available auto-refrigerant effect to avoid external refrigerant systems. At this higher temperature level, it is possible to operate with an aqueous solution of acetone as the absorber liquid rather than with a very dry acetone liquid.

More particularly, my invention relates to the absorption in acetone of carbon dioxide at substantial super atmospheric pressure and at temperatures which may be as high as 50° F. with a subsequent stripping of waste gas at low pressure thereby benefitting from the auto-refrigeration and permitting the use of aqueous acetone without formation of hydrates.

Other objects and advantages of my invention will appear from the following description of preferred forms of embodiment thereof, taken in connection with the drawings attached which are illustrative thereof and in which.

Figure 1:
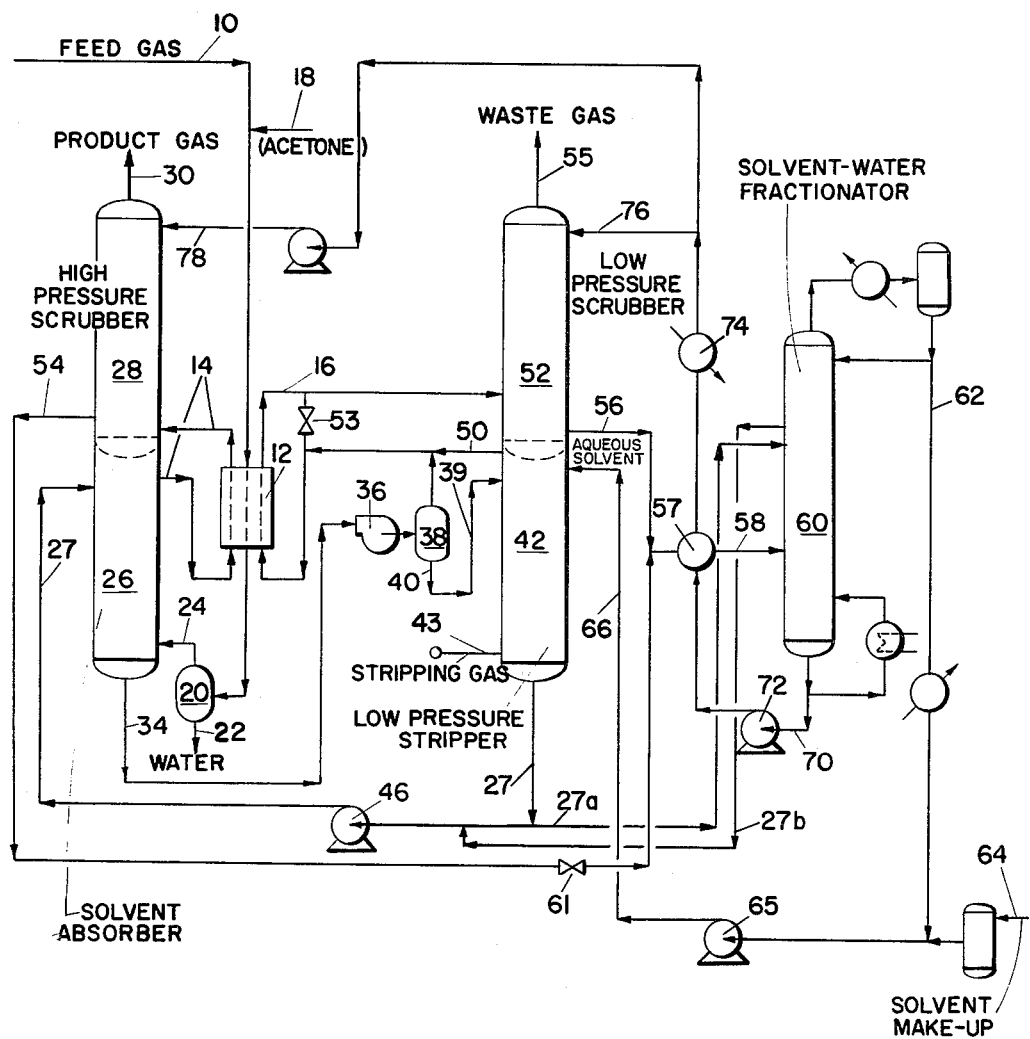
FIGURE 1 is a flow diagram of an absorption process for the removal of $CO_2$ from gaseous mixtures thereof, using acetone as the solvent.

The schematic flow diagram of FIGURE 1 is particularly adapted to the removal of $CO_2$ from a high pressure feed gas primarily hydrogen, with lesser amounts of other gases including CO and methane. The feed gas under high pressure, in the order of 200 to 400 p.s.i.g., enters the system at 10 and is preferably cooled to a temperature of about 25° F. by heat exchange at 12 with the product gas 14 and the waste gas 16 to remove any condensate, usually water. If necessary, acetone as a hydrate depressant will be injected into the feed gas stream at 18, up stream of the exchanger 12. The condensate separated from the gas in knockout drum 20 is removed at 22 and the gas is then introduced at 24 into the bottom of the acetone absorber 26.

Aqueous acetone is introduced at 27 into the top of absorber 26 for a countercurrent contact with the gas and the product gas, primarily hydrogen, leaves at 14 from the top of absorber 26. This gas then passes through the countercurrent heat exchanger 12 and into a high pressure water scrubbing tower 28 for scrubbing with water to remove any acetone vapors contained in the gas. The purified product gas stream 30 is removed from the top of the water scrubber 28 with less than about ½ percent $CO_2$ and only parts per million of acetone.

The rich solvent leaving the absorber 26 at 34 at the relatively high gas pressure is then flashed through an expander 36 to essentially atmospheric pressure in drum 38 with the gases going overhead at 39 and the solvent at 40 then passing into the low pressure stripper 42 for stripping of waste gas. When this stripper is operated at a pressure of substantially atmospheric, a $CO_2$ free stripping gas is introduced at 43. The quantity of stripping gas can be decreased by operating stripper 42 at a partial vacuum. In fact, the system can even be operated without a stripping gas if stripper 42 operates at a low enough vacuum. Make-up acetone may be introduced into the system through line 66. The regenerated lean aqueous acetone is then circulated back to the acetone absorber through line 27 and pump 46.

Under the selected operating conditions in stripper 42 there is sufficient auto-refrigeration developed by the $CO_2$ stripping and by the acetone vaporization so that the cold acetone leaving at 27 will set the desired operating conditions in absorber 26.

Waste gas leaving the stripper 42 at 50 then passes through the heat exchanger 12 countercurrent to the feed gas and enters through line 16 into the low pressure water scrubber 52. If stripper 42 is operated under a partial vacuum, the waste gas must be recompressed to a pressure slightly above atmospheric at 50. A bypass through expander valve 53 serves as a temperature control. This waste gas is water scrubbed with water entering at 76 to remove any acetone therein.

Water-solvent mixtures from both the high pressure scrubber in line 54 which passes through the expansion valve 61 and from the low pressure scrubber in line 56 are then heated in exchanger 57 and passed by line 58 into an acetone-water fractionator 60 to recover the dissolved acetone. The recovered acetone at 62 along with make-up acetone at 64 is then pumped at 65 through line 66 to the low pressure stripper 42. Water leaving the bottom of the acetone-water fractionator at 70 is pumped at 72 through heat exchanger 57 and heat exchanger 74 through lines 76 and 78 to the low pressure water scrubber 52 and to the high pressure scrubber 28.

The acetone absorber 26 operates in the temperature range of $-20°$ F. to $+50°$ F. depending upon the concentration of $CO_2$ in the feed gas and upon the pressure of the feed gas. I avoid extreme low temperature conditions which would cause hydrates and operate at substantially higher temperatures and pressures with aqueous acetone (at least 2 weight percent and up to 10 weight percent water). While the circulation rate is not optimum, the avoidance of carbon dioxide solid hydrate problems and the avoidance of external refrigeration required for very low temperatures is more than offset by the other economies possible. Temperatures in the preferred range are achieved by the $CO_2$ stripping as well as the vaporization of acetone in the waste gas leaving the stripping column. There is no need for heat exchangers on line 27. The available energy in expander 36 supplies part of the energy required by pump 46.

The solvent-water fractionator 60 may be used for water control in the solvent streams by drawing off a small stream 27a from the bottom of the low pressure stripper 42 and passing it through an upper part of the fractionator. A dried stream can be removed at a higher point and returned by line 27b upstream of the pump 46.

Under preferred operating conditions with a feed gas of approximately 78% hydrogen, 18% carbon dioxide with the balance carbon monoxide and methane, the absorber 26 is operated at 385 p.s.i.g. with the average temperature in the range of 55° F. to 45° F. The scrubber 28 is operated at 375 p.s.i.g. and the product gas leaves at 30 at about 100° F. It contains about 0.5% or less of carbon dioxide and only parts per million of acetone.

The low pressure stripper 12 operates at about 5 p.s.i.g. and with a unit handling about one million standard cubic feet of gas per hour, the expander 36 will produce in the order of 156 brake horse power. The acetone removed at 27 has a temperature in the order of 38° F.

Figure 2:
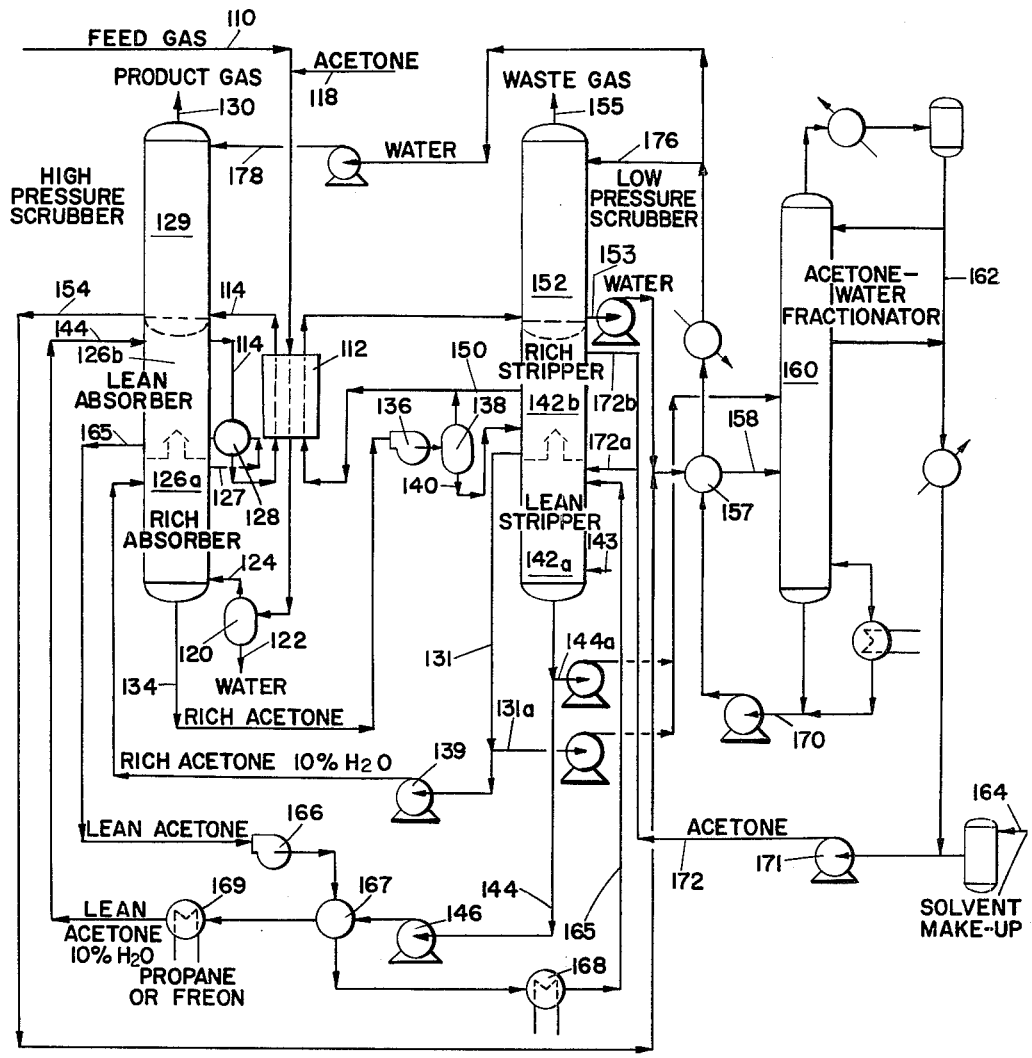
FIGURE 2 is a modified flow diagram for a similar operation wherein a very high purity gas product is desired.

A modified form of operation is shown in FIGURE 2 whereby a product gas can be produced containing concentrations of $CO_2$ as low as 10 parts per million. As in the first form of embodiment of the invention, the feed gas stream 110 is preferably cooled to a temperature of about 25° F. by heat exchange at 112 with the product gas 114 and the waste gas 150 leaving the system. Acetone as a hydrate depressant is injected at 118 into the feed gas stream. After cooling at 112, the gas mixture enters knockout drum 120 from which water is removed at 122, and the gas in line 124 enters the bottom of rich absorber 126a. The acidic gases are then absorbed in rich acetone entering by line 131 and passing in countercurrent flow to the rising gases.

In this form of embodiment of the invention, the lean gas leaving the top of the rich absorber 126a then passes through line 127 through a heat exchanger 128 where it is cooled slightly and then enters lean absorber 126b. It is now contacted with lean acetone entering at 144. The purified product gas then leaves through line 114, and heat exchanger 112, and enters the bottom of a high pressure water scrubber 129. Water enters the upper part of scrubber 129 through line 178 by which the acetone vapors are recovered from the product gas leaving at 130, the aqueous acetone being removed at 154.

The rich acetone at 134 leaving the rich absorber 126a is expanded at 136 as described in the previous process and passed through a knockout drum 138 with the liquid passing by line 140 to the rich stripping section 142b. Rich aqueous acetone leaving this section of the stripper through line 131 is recycled by pump 139 back to the top of the rich absorber section 126a.

The gases leaving the rich stripper 142b through line 150 are warmed in the countercurrent heat exchanger 112 and are then passed to the low pressure water scrubber 152 wherein the acetone therein is removed with water entering at 176. Aqueous acetone leaving at 153 from the bottom of the scrubber 152 is pumped and passed through heat exchanger 157 and line 158 to the solvent water fractionator 160.

Lean acetone in line 165 from the lean absorber section 126b, after expansion at 166 and heat exchange at 167 and 168, enters the lean stripper section 142a wherein it is stripped, if at or above atmospheric pressure with stripping gas entering at 143. No stripping gas is required if this section is operated at subatmospheric pressure. The stripped lean acetone is then removed as bottoms through line 144 and passed through pump 146, heat exchangers 167 and 169, the latter of which may be cooled with Freon or propane and then fed into the top of the lean absorber section 126b.

The aqueous acetone in line 154 from the high pressure scrubber joins the aqueous acetone in line 135 entering the water-acetone fractionator 160 where the acetone is recovered at 162 and the water recovered at 170. As in the prior case, slip streams of acetone may be removed at 144a and 131a and passed through the fractionator 160 with the controlled quality of acetone returned at 172a and b. Make-up solvent is provided at 164 and is pumped at 171 into both stripper sections.

The temperature at which the rich absorber 126a will operate depends upon the pressure of the feed gas and the concentration of carbon dioxide in the feed gas. The lean absorber 126b will operate in the temperature range of −25° F. to −20° F.

The stripping gas which is used at 143 to strip carbon dioxide from the acetone streams may be any carbon dioxide-free gas. If this purification system is used in a hydrogen plant in which hydrogen is produced by partial oxidation, then nitrogen from the air recovery plant would be used as a stripping gas. Another alternative is to use the vent from an ammonia plant or a liquid nitrogen scrubbing system, which is used for the purification of hydrogen going to an ammonia plant. An additional source of stripping gas can be the carbon monoxide recovered from a copper liquor system, if such a system is used for the removal of carbon monoxide in a hydrogen manufacturing plant.

While I have shown and described preferred forms of embodiment of my invention, I am aware that modifications may be made thereto which I consider to be within the scope and spirit of the disclosure herein and of the claims appended hereinafter.

I claim:

1. An auto-refrigerated absorption process for the removal at super-atmospheric pressures of hydrate forming acidic gases consisting predominantly of carbon dioxide from a carbon dioxide containing feed of mixed gases including a desired product gas which comprises:

(a) chilling the feed of mixed gases by indirect heat exchange with the subsequently separated acidic-gas-free product gas and at least a portion of the subsequently separated acidic gases;

(b) passing said chilled feed of mixed gases through an absorption zone in countercurrent contact with aqueous acetone containing 2 to 10 weight percent water at temperatures of −20° F. to 50° F. and super-atmospheric pressure whereby the major portion of the acidic gases is absorbed in the aqueous acetone to give a product gas low in acidic gases;

(c) separating the aqueous acetone rich in acidic gases from the product gas;

(d) removing and expanding said aqueous acetone rich in acidic gases at substantially the temperature it leaves the absorption zone to a low pressure stripping zone;

(e) stripping said acidic gases from said aqueous acetone in the stripping zone by contacting same and vaporizing some acetone with a stripping gas essentially free of acidic gases to produce aqueous acetone essentially free of acidic gases thereby providing auto-refrigeration by the stripping of the acidic gases and by vaporization of part of the acetone;

(f) pumping the aqueous acetone from the stripping zone to essentially the pressure of the absorption zone and passing said aqueous acetone at essentially the same temperature as it leaves the stripping zone to the absorption zone;

(g) said indirect heat-exchange of step (a) heating the separated acidic-gas-free product gas from the absorption zone and at least the portion of stripped acidic gas from the stripping zone to essentially ambient temperature by indirect heat exchange with the feed of mixed gases;

(h) recovering acetone vapors in the product gas coming from said indirect heat exchange by scrubbing said acid-gas-free product gas with water to form a water acetone solution;

(i) recovering acetone vapors in the stripped acidic gases by scrubbing said stripped acidic gases with water to form a water acetone solution;

(j) fractionating the water-acetone solutions from steps (h) and (i) to produce a concentrated aqueous acetone and water;

(k) returning the water to the water scrubbing steps (h) and (i) and returning the concentrated aqueous acetone to the stripping zone.

2. An absorption process as claimed in claim 1 wherein the stripping step is accomplished at about atmospheric pressure.

3. An absorption process as claimed in claim 1 wherein the stripping step is accomplished under vacuum.

4. An absorption process as claimed in claim 1 wherein a small stream of aqueous acetone from the stripping step is fractionated to control the water content thereof.

5. An absorption process as claimed in claim 1 wherein the expansion step is accomplished with the production of energy.

6. An auto-refrigerated absorption process for the removal, at super-atmospheric pressure, of hydrate forming acidic gases consisting predominantly of carbon dioxide from a carbon dioxide containing feed of mixed gases including a desired product gas which comprises;

(a) chilling the feed of mixed gases by indirect heat exchange with the subsequently separated acidic-gas free product gas and at least a portion of the subsequently separated acidic gases;

(b) passing said chilled feed of mixed gases through a rich acidic-gas absorption zone in countercurrent contact with aqueous acetone containing 2 to 10 weight percent water at temperatures of −20° to 50° F. and at super-atmospheric pressure whereby the major portion of the acidic gases is absorbed in the aqueous acetone to give a product gas low in acidic gases;

(c) separating the aqueous acetone rich in acidic gases from the product gas;

(d) passing said product gas low in acidic gases through a lean absorption zone in countercurrent contact with lean acetone containing 2 to 10 weight percent water at −20° to −25° F. and at super-atmospheric pressure for removal of residual acidic gases;

(e) separating the aqueous acetone containing acidic gases from the product gas;

(f) removing and expanding said aqueous acetone from said rich acidic gas absorption zone at substantially the temperature it leaves the absorption zone to a low pressure acidic-gas-rich stripping zone;

(g) removing and expanding said aqueous acetone from said lean acidic gas absorption zone at substantially the temperature it leaves the lean-acidic-gas absorption zone to a low pressure stripping zone;

(h) heating the removed and expanded lean acetone of step (g) by indirect heat exchange with lean acetone passing to the lean acidic gas absorption zone and passing said heated and expanded lean acetone to the lean acidic gas stripping zone;

(i) stripping said acidic gases from said aqueous expanded acetone from the rich absorption zone in a rich stripping zone by contacting same and vaporizing some acetone with a stripping gas from the lean stripping zone to produce aqueous acetone essentially free of acidic gases thereby providing auto-refrigeration by the stripping of the acidic gases and by vaporization of part of the acetone;

(j) pumping the aqueous acetone from step (i) to essentially the pressure of the righ acidic-gas absorption zone and returning said aqueous acetone at essentially the same temperature as it leaves the rich stripping zone to the rich acidic gas absorption zone;

(k) stripping said residual acidic gases from said lean acetone from step (h) in the lean acidic gas stripping zone with a stripping gas essentially free of acidic gases to produce aqueous acetone essentially free of acidic gases;

(l) pumping the regenerated aqueous acetone of the lean acidic gas stripping zone to essentially the super-atmospheric pressure of the lean acidic gas absorption zone and cooling aqueous lean acetone from the lean acidic gas stripping zone by indirect heat exchange with the expanded aqueous lean acetone from the lean acidic gas absorption zone;

(m) further cooling said aqueous lean acetone with outside refrigeration and returning said resulting cold aqueous acetone to the lean absorption zone;

(n) said indirect heat exchange of step (a) heating the separated acidic-gas-free product gas from the rich acidic gas absorption zone and at least a portion of the acidic gas from the acidic gas stripping zone by indirect heat exchange with a portion of the feed of mixed gases;

(o) recovering acetone vapors in the product gas coming from said indirect heat exchange by scrubbing said product gas with water to obtain a water acetone solution;

(p) recovering acetone vapors in the acidic gases by scrubbing said acidic gases with water to obtain a water acetone solution;

(q) fractionating the water-acetone solutions from steps (o) and (p) to produce a concentrated aqueous acetone and water;

(r) returning the water to the water scrubbing steps (o) and (p) and returning the concentrated aqueous acetone to the acidic gas stripping zones.

7. An absorption process as claimed in claim 6 wherein the stripping step is accomplished at about atmospheric pressure.

8. An absorption process as claimed in claim 6 wherein the stripping step is accomplished under vacuum.

9. An absorption process as claimed in claim 6 wherein a small stream of aqueous acetone from the stripping step is fractionated to control the water content thereof.

10. An absorption process as claimed in claim 6 wherein the expansion step is accomplished with the production of energy.

References Cited by the Examiner

UNITED STATES PATENTS

| | | | |
|---|---|---|---|
| 2,738,860 | 3/1956 | Lorenz et al. | 55—48 |
| 2,870,868 | 1/1959 | Eastman et al. | 55—48 |
| 2,880,591 | 4/1959 | Kwuak | 55—48 |
| 2,891,633 | 6/1959 | Morro et al. | 55—65 |
| 2,894,037 | 7/1959 | Kindler | 55—48 |

FOREIGN PATENTS

| | | |
|---|---|---|
| 565,018 | 10/1958 | Canada. |
| 691,487 | 5/1953 | Great Britain. |

REUBEN FRIEDMAN, *Primary Examiner.*